United States Patent
Shigemori

(10) Patent No.: US 7,075,868 B2
(45) Date of Patent: Jul. 11, 2006

(54) RECORDING CLOCK GENERATING APPARATUS FOR A DATA RECORDING SYSTEM

(75) Inventor: Toshihiro Shigemori, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/745,609

(22) Filed: Dec. 29, 2003

(65) Prior Publication Data

US 2004/0136287 A1 Jul. 15, 2004

Related U.S. Application Data

(63) Continuation of application No. 09/537,691, filed on Mar. 29, 2000, now Pat. No. 6,693,862.

(30) Foreign Application Priority Data

Mar. 31, 1999 (JP) ............................................ 11-092808
Jul. 16, 1999 (JP) ............................................ 11-203173

(51) Int. Cl.
*G11B 7/00* (2006.01)

(52) U.S. Cl. ................................. 369/47.31; 369/47.28; 369/53.34

(58) Field of Classification Search .............. 369/47.28, 369/47.31, 47.51, 53.34, 59.11, 59.2
See application file for complete search history.

(56) References Cited

U.S. PATENT DOCUMENTS 5,272,451 A 12/1993 Yamate et al.
5,920,530 A 7/1999 Kuroda et al.
6,118,742 A 9/2000 Matsui et al.
6,211,742 B1 4/2001 Tan et al.
6,324,136 B1 11/2001 Yoshida et al.
6,693,862 B1 * 2/2004 Shigemori ............... 369/47.31

FOREIGN PATENT DOCUMENTS

JP    10-293926 A    11/1998

* cited by examiner

Primary Examiner—W. R. Young
(74) Attorney, Agent, or Firm—Dickstein Shapiro Morin & Oshinsky LLP

(57) ABSTRACT

A recording clock generating apparatus for a data recording system includes a wobble signal sampler which samples a wobble signal, from wobble grooves of an optical disk. A first phase comparator provides a first phase-difference signal based on a difference in phase between the wobble signal and a first recording clock signal. A prepit detector detects a prepit signal from prepits of the optical disk. A second phase comparator provides a second phase-difference signal based on a difference in phase between the prepit signal and the first recording clock signal. A phase control signal generator provides a phase control signal based on a sum of the first phase-difference signal and the second phase-difference signal. A clock generator provides a second recording clock signal having a phase corrected in response to the phase control signal provided by the phase control signal generator.

7 Claims, 11 Drawing Sheets

RECORDING CLOCK GENERATING APPARATUS FOR A DATA RECORDING SYSTEM

The present application is a continuation of application Ser. No. 09/537,691, filed Mar. 29, 2000, now US Pat. No. 6,693,862, the entire disclosure of which is incorporated herein by reference.

BACKGROUND OF THE INVENTION

1. Field of the Invention

The present invention generally relates to a recording clock generating apparatus for a data recording system. In particular, the present invention relates to a recording clock generating apparatus which produces a recording clock signal for a data recording system in which a write head records data onto an optical disk or another recording medium by sending a powered pulse of a laser beam at a rate that is synchronized with the recording clock signal produced by the recording clock generating apparatus.

2. Description of the Related Art

CD-ROMs (compact disk read-only-memories) and DVDs (digital versatile disks) are read-only, optical recording media, and have their rewritable equivalents, respectively. CD-ROM has a rewritable equivalent in CD-R (compact disk recordable). DVD has DVD-R (digital versatile disk recordable). Similar to a hard disk or the like, data can be recorded onto the rewritable media. CD-R and DVD-R differ in how much data can be written to them.

Both CD-R and DVD-R include a disk surface portion in which wobble grooves are formed in order to create a wobble signal indicative of rotation control sync information from the wobble grooves. In the disk surface portion of CD-R and DVD-R, the wobble grooves extend in a tangential track direction of the disk, and prepits are formed as the preformat information on the lands between neighboring grooves.

As the information recording capacity of DVD-R is much higher than the capacity of CD-R, a track pitch of DVD-R, which is a center-to-center distance between the neighboring grooves in the radial direction, is smaller than a track pitch of CD-R. In the case of DVD-R, because of the smaller track pitch, the crosstalk of neighboring grooves will not be negligible.

In certain circumstances when recording data onto a DVD-R, the sampled wobble signal, which is obtained from the DVD-R, may have significant variances of the amplitude and the phase due to the crosstalk of neighboring grooves. In this case, it is difficult to produce a recording clock signal that is precisely synchronized with the rotation of the disk, if the recording clock signal is produced based on the sampled wobble signal.

Japanese Laid-Open Patent Application No. 10-293926 discloses a recording clock generating device, which produces a recording clock signal synchronized with rotation of an optical disk. The recording clock generating device of the above publication is configured to eliminate the above-described problem.

In the above recording clock generating device, a prepit detector receives a composite signal superimposed with a prepit signal, and outputs a prepit detection signal during the presence of the prepit signal. A wobble signal sampler outputs an amplitude level of the composite signal when a sampled wobble signal continues to be at a high level over a period exceeding a predetermined reference time.

In the above recording clock generating device, a PLL (phase-locked loop) circuit outputs a clock signal, which is phase-locked to the sampled wobble signal, to a phase shifter. On the other hand, a phase comparator compares the phase of the prepit detection signal with the phase of the sampled wobble signal, and outputs a phase adjustment signal to the phase shifter. Then, the phase shifter adjusts the phase of the clock signal based on the phase adjustment signal, and the clock signal with the thus adjusted phase is delivered to the write head control module of the data recording system.

However, the above recording clock generating device requires the phase shifter that adjusts the phase of the clock signal based on the phase adjustment signal. There was a problem in that the phase shifter is expensive and the use of the phase shifter considerably raises the manufacturing cost of the recording clock generating device.

SUMMARY OF THE INVENTION

In order to overcome the problems described above, preferred embodiments of the present invention provide an improved recording clock generating apparatus that is constructed with a simplified configuration with low cost and produces a recording clock signal precisely synchronized with rotation of an optical disk even when the crosstalk of neighboring grooves is provided by the optical disk.

According to one preferred embodiment of the present invention, a recording clock generating apparatus produces a recording clock signal for a data recording system, the data recording system recording data onto an optical disk by sending a powered pulse of a laser beam synchronized with the recording clock signal, the optical disk having wobble grooves and prepits formed with a given phase relation to each other, the recording clock generating apparatus including: a wobble signal sampler which samples a wobble signal from the wobble grooves of the disk, the wobble signal being indicative of a disk rotation frequency; a first phase comparator which provides a first phase-difference signal based on a difference in phase between the wobble signal and a first recording clock signal; a prepit detector which detects a prepit signal from the prepits of the disk, the prepit signal being indicative of preformat information; a second phase comparator which provides a second phase-difference signal based on a difference in phase between the prepit signal and the first recording clock signal; a phase control signal generator which provides a phase control signal based on a sum of the first phase-difference signal and the second phase-difference signal; and a clock generator which provides a second recording clock signal having a phase corrected in response to the phase control signal provided by the phase control signal generator.

In the recording clock generating apparatus of the present invention, the phase control signal generator produces a phase control signal based on the sum of the first phase-difference signal and the second phase-difference signal. The clock generator produces a recording clock signal having a phase corrected in response to the phase control signal. The phase control signal generator and the clock oscillator in the recording clock generating apparatus of the present invention can be constructed with a simplified configuration with low cost. At the same time, the recording clock generating apparatus of the present invention is effective in producing a recording clock signal precisely synchronized with rotation of the optical disk even when the crosstalk of neighboring grooves is provided by the optical disk.

BRIEF DESCRIPTION OF THE DRAWINGS

Other objects, features and advantages of the present invention will become apparent from the following detailed description when read in conjunction with the accompanying drawings in which.

DETAILED DESCRIPTION OF PREFERRED EMBODIMENTS

Before describing preferred embodiments of the present invention, a description will now be given of the basic configurations of a DVD-R with reference to FIG. 2 and FIG. 3, in order to facilitate understanding of the present invention.

Figure 2:
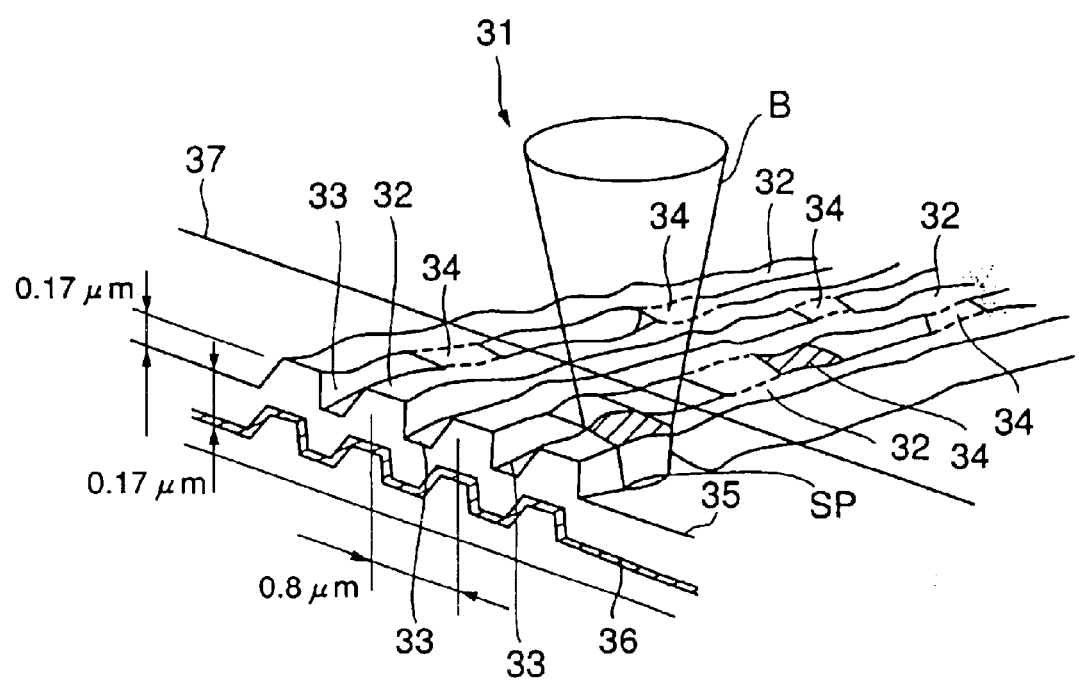
FIG. 2 is a diagram for explaining a relationship between wobbling grooves and prepits of a DVD-R.

FIG. 2 is a diagram for explaining a relationship between wobbling grooves and prepits of a DVD-R.

Generally, in a DVD-R, wobble grooves extending in a tangential track direction of the disk are formed in order to create a wobble signal, indicative of a frequency of a predetermined disk rotation speed, by sampling it from the wobble grooves of the disk. Further, in the DVD-R, prepits are formed on the lands between neighboring grooves in order to create a prepit signal, indicative of preformat information, such as address information, by detecting it from the prepits of the disk. The wobble grooves and the prepits are formed on the DVD-R such that the wobble grooves and the prepits have a given phase relation to each other.

As shown in FIG. 2, a DVD-R 31 includes a recording layer 35 of a dyed color material. A write head (not shown in FIG. 2) emits a converging laser beam "B" to the DVD-R 31 so that a focused spot "SP" is formed thereon. The laser beam B has a specific frequency, and the dye layer 35 is designed to absorb the energy from the laser beam B at the specific frequency. Absorbing the energy from the laser beam B creates a mark in the dye layer 35. The write mark is called a pit. The change in the dye layer 35 is permanent, making the DVD-R 31 a write-once, read-many recording medium.

Data that is recorded onto the DVD-R 31 is represented by a combination of lands 33 and grooves 32 (with pits formed thereon) in the recording layer 35. The grooves 32 are wobble grooves that have a continuous wave pattern, and the frequency of the waves corresponds to a frequency of a predetermined disk rotation speed. The frequency of the disk rotation speed is provided as a frequency of the sampled wobble signal. The laser beam B from the write head follows one of the wobble grooves 32, and the neighboring lands 33 of the groove help guide the laser beam B. Data is written in the wobble grooves 32 and the lands 33 serve as a guard band.

In the DVD-R 31 of FIG. 2, a reflection layer 36 of gold deposited on the bottom of the recording layer 35, is provided to reflect the laser beam B. A protective layer 37 is provided on the top of the recording layer 35 to protect the land/groove pattern in the recording layer 35.

Further, in the DVD-R 31 of FIG. 2, prepits 34 are formed on the lands 33 between neighboring grooves 32 in order to create a prepit signal indicative of preformat information, such as address information. The prepits 34 are pre-recorded on the DVD-R 31 in the manufacturing process or before it is delivered from the factory.

Similar to the prepits 34, the wobbling grooves 32 are pre-recorded on the DVD-R 31 in the manufacturing process or before it is delivered from the factory.

When recording data onto the DVD-R 31, a wobble signal is sampled from the wobble grooves 32, and the frequency of the sampled wobble signal is detected. Based on the detected frequency, the rotation of the DVD-R 31 during recording is controlled by the data recording system. A prepit signal is detected from the prepits 34, and the preformat information is obtained from the prepit signal. The level of the powered pulse of the laser beam is controlled to an optimum level based on the preformat information. Further, the address information is obtained from the prepit signal, and the location of the DVD-R 31 where the data is recorded is determined based on the address information.

As shown in FIG. 2, the laser beam B follows one of the wobble grooves 32 such that the center of the laser beam B accords with the centerline of that groove. The data is written in the wobble grooves 32, and the lands 33 serve as a guard band. The focused spot SP of the laser beam B hits not only the wobble groove 32 but also the neighboring lands 33 of the groove.

A number of photodetectors of the data recording system receive the reflection beams from the DVD-R 31. According to a push-pull method, the prepit signal and the wobble signal are obtained based on the reflections beams received at the photodetectors.

Figure 3:
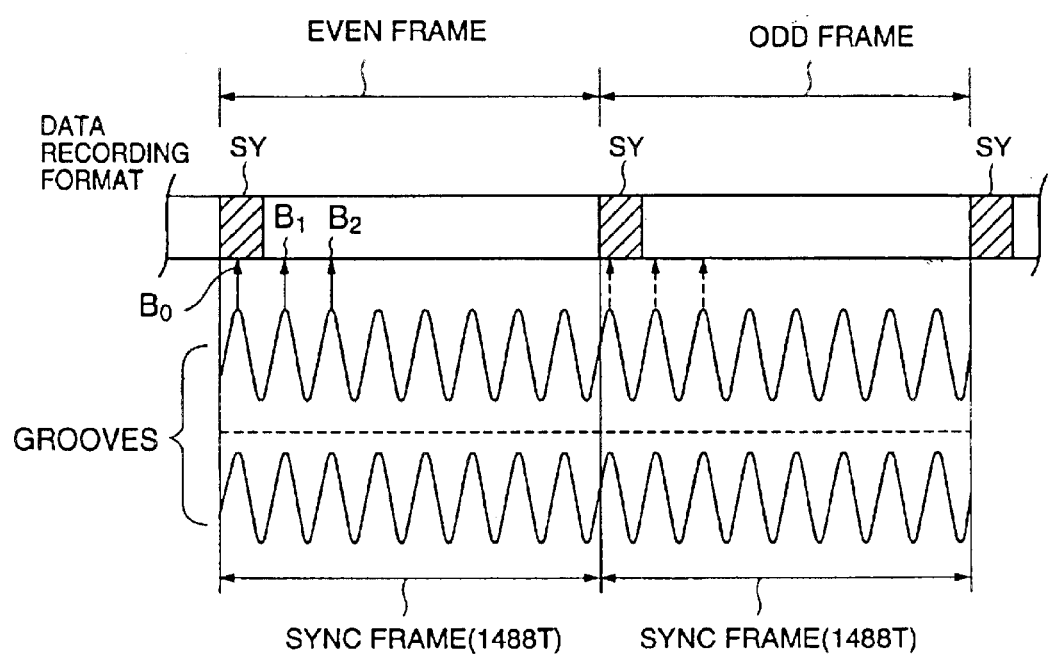
FIG. 3 is a diagram for explaining a data recording format of the DVD-R shown in FIG. 2.

FIG. 3 is a diagram for explaining a data recording format of the DVD-R shown in FIG. 2.

Data is recorded onto the DVD-R 31 in a data recording format that is indicated in an upper portion of FIG. 3. A pattern of the wobble grooves 32 in the DVD-R 31 is indicated by the waveforms in a lower portion of FIG. 3. For the purpose of illustrating the shape of the wobble grooves 32, the amplitude of the wobble grooves 32 is enlarged from the actual level. The up arrows "B0", "B1" and "B2" indicate positions of the data recording format which correspond to positions where the prepits 34 are formed on the disk. The data is recorded in the form of pits along the center line of the grooves 32.

As shown in FIG. 3, the data that is recorded onto the DVD-R 31 is divided into sync frames. A sector of the recorded data is made up of 26 sync frames. An ECC (error correcting code) block is made up of 16 sync frames.

Suppose that a unit length T represents a distance of one of pits on the DVD-R 31 in the tangential track direction of the disk. One sync frame has a distance corresponding to 1488T (1488 times the unit length T) along the track of the disk. The front end of each sync frame, which has a distance corresponding to 14T, carries sync information SY used for synchronization between sync frames.

The preformat information is pre-recorded onto DVD-R 31 for every sync frame. As shown in FIG. 2, the prepits 34, carrying the preformat information, are formed on the lands 33 between neighboring grooves 32. With respect to each of the sync frames contained in the recorded data, one prepit 34 is formed at the location (indicated by the up arrow B0 in FIG. 3) corresponding to the front-end region of the sync information SY of that sync frame, one or two prepits 34 are formed at the locations (indicated by the up arrows B1 and B2 in FIG. 3) corresponding to the subsequent region of that sync frame following the sync information SY.

In the DVD-R 31 of FIG. 2, the prepits 34 are provided on the lands 33 between neighboring grooves 32 such that the prepits 34 on the adjacent lands 33 are not aligned with each other in the radial direction of the disk.

Specifically, in a certain case, the prepits 34 are formed for even-number sync frames of one sector of the recorded data but no prepits are formed for odd-number sync frames of the sector. In the example of FIG. 3, the prepits 34 (indicated by the up arrows B0, B1 and B2) are formed for the even-number sync frame but no prepits are formed for the adjacent odd-number sync frame. In the DVD-R 31, the prepits 34 on the adjacent lands 33 are not aligned with each other in the radial direction of the disk.

Accordingly, the prepit signal, which is detected from the prepits of the DVD-R 31, is not influenced by the crosstalk of neighboring grooves. However, the wobble signal, which is sampled from the wobble grooves of the DVD-R 31, may vary along the time axis by the crosstalk of neighboring grooves.

Further, in the DVD-R 31, the wobble grooves and the prepits are formed such that the wobble grooves and the prepits have a given phase relation to each other. To achieve this, the prepits 34 are provided on the DVD-R 31 so as to have a given phase relation to the phase of the wobble signal. For example, the prepit B0 is provided at a given position (for example, at a distance of 7T) from the beginning position of one sync frame and the prepits B1 and B2 are provided at given positions (for example, at distances of 186T and 372T) from the position of the prepit B0.

A description will now be provided of preferred embodiments of the present invention with reference to the accompanying drawings.

Figure 1:
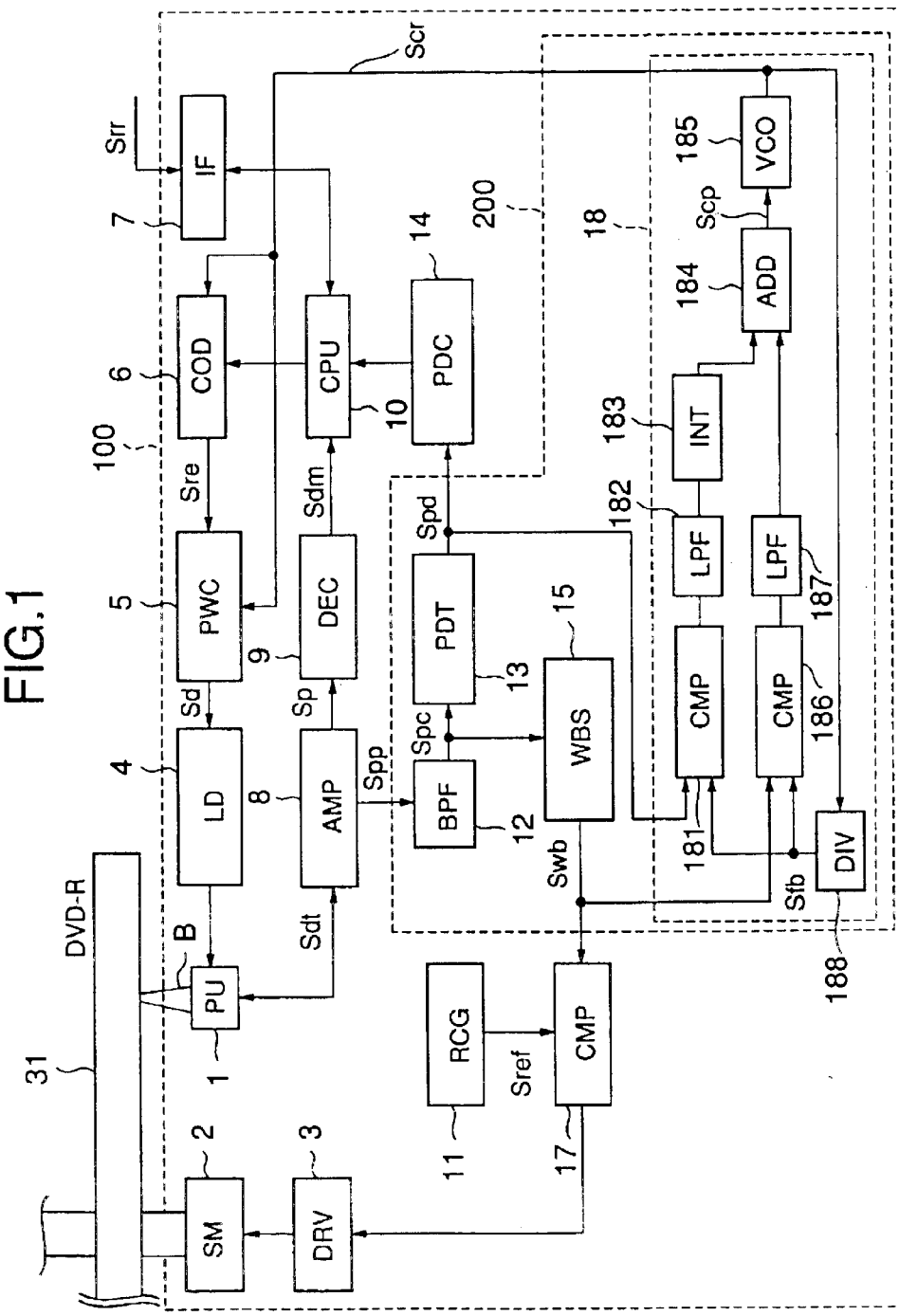
FIG. 1 is a block diagram of one preferred embodiment of a recording clock generating apparatus of the invention.

FIG. 1 shows one preferred embodiment of the recording clock generating apparatus of the invention.

As shown in FIG. 1, a data recording system 100 generally comprises a pickup (PU) 1, a spindle motor (SM) 2, a spindle motor driver (DRV) 3, a laser driver (LD) 4, a power control unit (PWC) 5, a data encoder (COD) 6, an interface (IF) 7, a replay amplifier (AMP) 8, a data decoder (DEC) 9, a central processor unit (CPU) 10, a reference-clock generator (RCG) 11, a band-pass filter (BPF) 12, a prepit signal detector (PDT) 13, a prepit signal decoder (PDC) 14, a wobble signal sampler (WBS) 15, a phase comparator (CMP) 17, and a phase-locked loop (PLL) module 18.

In the data recording system 100 of FIG. 1, the BPF 12, the prepit signal detector 13, the wobble signal sampler 15 and the PLL module 18 constitute a recording clock generating apparatus 200 of the present embodiment. When the data recording system 100 records data onto the DVD-R 31, a host computer (not shown) externally supplies a data signal Srr to the CPU 10 via the interface 7.

In the data recording system 100 of FIG. 1, the pickup 1 records data onto the DVD-R (which will be called the optical disk) 31 by sending a powered pulse of a laser beam B at a rate that is synchronized with a recording clock signal. The pickup 1 generally includes a laser diode, a polarization beam splitter, an objective lens, and photodetectors.

When recording data onto the optical disk 31, the laser driver 4 delivers a laser drive signal to the pickup 1. The laser drive signal is produced in accordance with the data signal, and the powered pulse of the laser beam B emitted by the pickup 1 is controlled by the laser drive signal.

When reading or reproducing data from the optical disk 31, the pickup 1 sends a constantly powered level of the laser beam B to the disk 31. The photodetectors receive the reflection beams from the optical disk 31, and convert them into an electrical signal. Calculations and signal processing according to the push-pull method are performed on the electrical signal, and a playback signal Sdt, which carries playback data, the prepit signal and the wobble signal, is obtained. The playback signal Sdt is delivered to the reproducing amplifier 8.

The reproducing amplifier 8 amplifies the playback signal Sdt, and provides a playback data signal Sp carrying the playback data and a preformat information signal Spp carrying the prepit signal and the wobble signal. In the reading mode, the playback data signal Sp is delivered from the amplifier 8 to the data decoder 9. In either case of the reading mode and the reading mode, the preformat information signal Spp is delivered from the amplifier 8 to the BPF 12.

The data decoder 9 performs 8/16 demodulation and deinterleaving processings for the playback data signal Sp, and provides a reconstructed data signal Sdm. The reconstructed data signal Sdm is delivered to the CPU 10.

The BPF 12 removes noise components from the preformat information signal Spp and provides a composite signal Spc in which the prepit signal is superimposed at a given position (for example, at a peak-amplitude position) on the wobble signal. See FIG. 4 for the composite signal Spc indicated by (a) in FIG. 4. The composite signal Spc is delivered from the BPF 12 to each of the prepit signal detector 13 and the wobble signal sampler 15.

Figure 4:
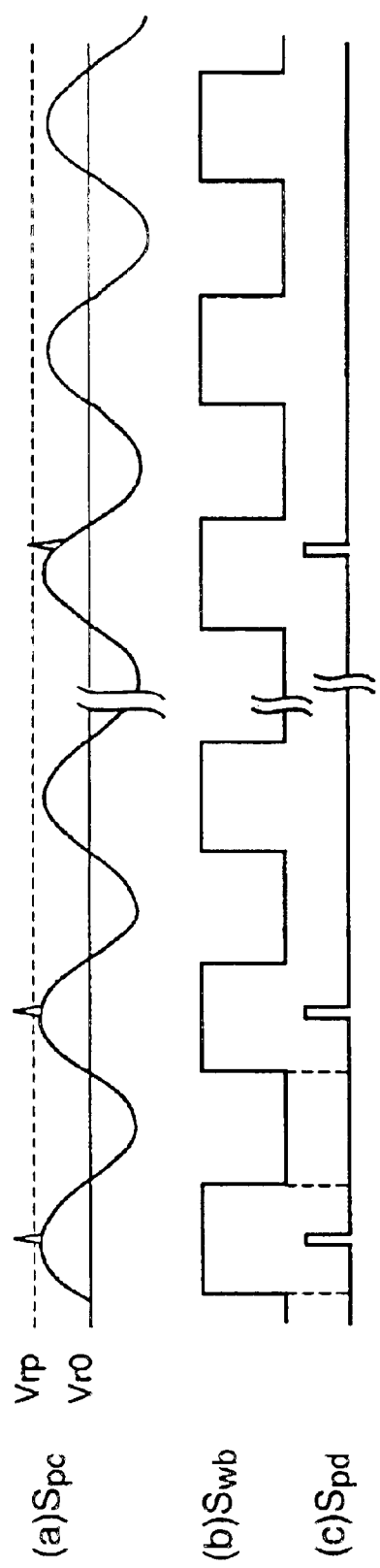
FIG. 4 is a waveform diagram for explaining an operation of the recording clock generating apparatus of FIG. 1.

FIG. 4 is a waveform diagram for explaining an operation of the recording clock generating apparatus 200 of FIG. 1.

The prepit signal detector 13 detects a prepit signal Spd by comparing the level of the amplitude of the composite signal Spc with a peak reference level. The composite signal Spc has a waveform that is indicated by (a) in FIG. 4. Suppose that "Vro" indicates a central reference level of the amplitude of the composite signal Spc, and "Vrp" indicates the peak reference level of the prepit signal detector 13. The peak reference level Vrp is predetermined to be an appropriate value that is higher than the peak amplitude of the wobble signal. The prepit signal detector 13 outputs a high-level pulsed prepit signal Spd only during the time that the level of the amplitude of the composite signal Spc is higher than the peak reference level Vrp. Otherwise the prepit signal detector 13 outputs a low-level prepit signal Spd. The thus detected prepit signal Spd is delivered to each of the prepit signal decoder 14 and the PLL module 18. The prepit signal Spd has a waveform that is indicated by (c) in FIG. 4.

The prepit signal decoder 14 produces reconstructed preformat information, including the address information of the DVD-R 31, based on the prepit signal Spd. The reconstructed preformat information is delivered to the CPU 10.

The wobble signal sampler 15 samples a wobble signal Swb by comparing the level of the amplitude of the composite signal Spc with the central reference level Vro. The wobble signal sampler 15 outputs a high-level pulsed wobble signal Swb only during the time that the level of the amplitude of the composite signal Spc is higher than the central reference level Vro. Otherwise the wobble signal sampler 15 outputs a low-level wobble signal Swb. The thus detected wobble signal Swb is delivered to each of the phase comparator 17 and the PLL module 18. The wobble signal Swb has a waveform that is indicated by (b) in FIG. 4.

As shown in FIG. 1, the PLL module 18 generally comprises a phase comparator (CMP) 181, a low-pass filter (LPF) 182, an integrator (INT) 183, an adder (ADD) 184, a voltage-controlled oscillator (VCO) 185, a phase comparator 186 (CMP) 186, a low-pass filter (LPF) 187, and a frequency divider (DIV) 188. The PLL module 18 provides a recording clock signal Scr in response to the prepit signal Spd and the wobble signal Swb, which will be explained later in greater detail. The recording clock signal Scr is delivered to each of the power control unit 5 and the data encoder 6.

In the data recording system 100 of FIG. 1, the reference clock generator 11 produces a reference clock signal Sref. The phase comparator 17 receives the reference clock signal Sref and the wobble signal Swb, and provides a rotation control signal based on a phase difference between the reference clock signal Sref and the wobble signal Swb. The wobble signal Swb carries the frequency of the disk rotation speed obtained from the DVD-R 31. The rotation control signal is delivered through the spindle motor driver 3 to the spindle motor 2. The DVD-R 31 is rotated by the spindle motor 2 at a controlled speed in accordance with the rotation control signal.

When the data signal Srr from the external host computer (not shown) is received via the interface 7, the CPU 10 sends the received data signal Srr to the data encoder 6.

The data encoder 6 performs error correction, 8/16 modulation and scrambling processings for the data signal Srr at the rate synchronized with the recording clock signal Scr, and provides a modulation signal Sre as the result of such processings. The modulation signal Sre is delivered to the power control unit 5.

The power control unit 5 performs waveform correction for the modulation signal Sre at the rate synchronized with the recording clock signal Scr, such that the pits created on the optical disk according to the modulation signal Sre are of an appropriate shape. The power control unit 5 provides a recording data signal Sd as the result of such a processing. The recording data signal Sd is delivered to the laser driver 4.

The laser driver 4 produces the laser drive signal in accordance with the recording data signal Sd. The laser drive signal is delivered from the laser driver 4 to the pickup 1. The powered pulse of the laser beam B emitted by the laser diode (not shown) of the pickup 1 is controlled by the laser drive signal produced by the laser driver 4.

The CPU 10 controls the elements of the entire data recording system 100. When recording data onto the DVD-R 31, the CPU 10 receives the reconstructed preformat information from the prepit signal decoder 14, and provides the address information, obtained from the preformat information, to the data encoder 6, so that the data is recorded onto the DVD-R 31 at a position corresponding to the address information.

When reproducing data from the DVD-R 31, the CPU 10 receives the reconstructed data signal Sdm from the data decoder 9, and transmits the data signal Sdm to the external host computer via the interface 7.

Next, a description will be given of detailed structure and operations of the recording clock generating apparatus of the present embodiment.

In the recording clock generating apparatus 200 of FIG. 1, the phase comparator 181 produces a first phase-difference signal based on a difference in phase between the prepit signal Spd and a feedback clock signal Sfb, and this first phase-difference signal is delivered through the LPF 182 and the integrator 183 to the adder 184. The phase comparator 186 produces a second phase-difference signal based on the sampled wobble signal Swb and the feedback clock signal Sfb, and this second phase-difference signal is delivered through the LPF 187 to the adder 184. The adder 184 produces a phase control signal Scp based on a sum of the first phase-difference signal (which is delivered from the phase comparator 181) and the second phase-difference signal (which is delivered from the phase comparator 186). The VCO 185 produces a recording clock signal Scr having a phase corrected in response to the phase control signal Scp. The recording clock signal Scr is delivered to each of the data encoder 6, the power control unit 5, and the frequency divider 188. A reference frequency of the recording clock signal Scr corresponds to, for example, one unit length (=1T).

In response to the recording clock signal Scr output by the VCO 185, the frequency divider 188 outputs the feedback clock signal Sfb having a lower frequency that is produced by dividing the reference frequency by a given division factor. In other words, the reference frequency of the recording clock signal Scr is changed by the frequency divider 188 to a submultiple of the reference frequency as the lower frequency of the feedback clock signal Sfb.

As shown in FIG. 3, one sync frame has the distance corresponding to 1488T. In other words, one sync frame has a period of 1488T that is 1488 times the period of the recording clock signal Scr. This period of one sync frame corresponds to 8 times the period of the sampled wobble signal Swb. Hence, the sampled wobble signal Swb has a period of 186T that is equal to ⅛ of the period (1488T) of one sync frame.

Suppose that the division factor of the frequency divider 188 is set to 93 (=186/2). In this case, the lower frequency of the feedback clock signal Sfb at the output of the frequency divider 188 is exactly twice the frequency of the sampled wobble signal Swb.

The phase comparator 181 produces a first phase-difference signal based on a difference in phase between the prepit signal Spd and the feedback clock signal Sfb.

Figure 5:
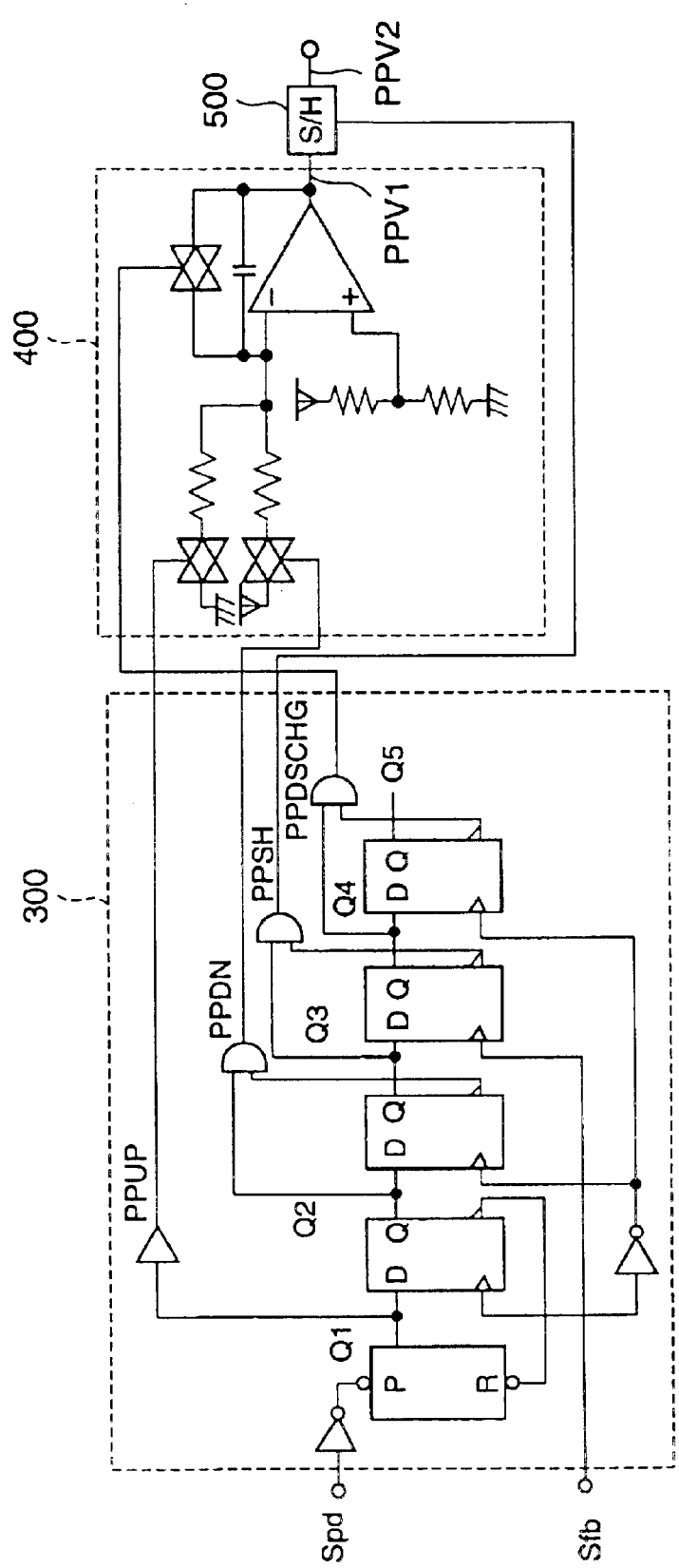
FIG. 5 is a circuit diagram of a phase comparator in the recording clock generating apparatus of FIG. 1.
Figure 6:
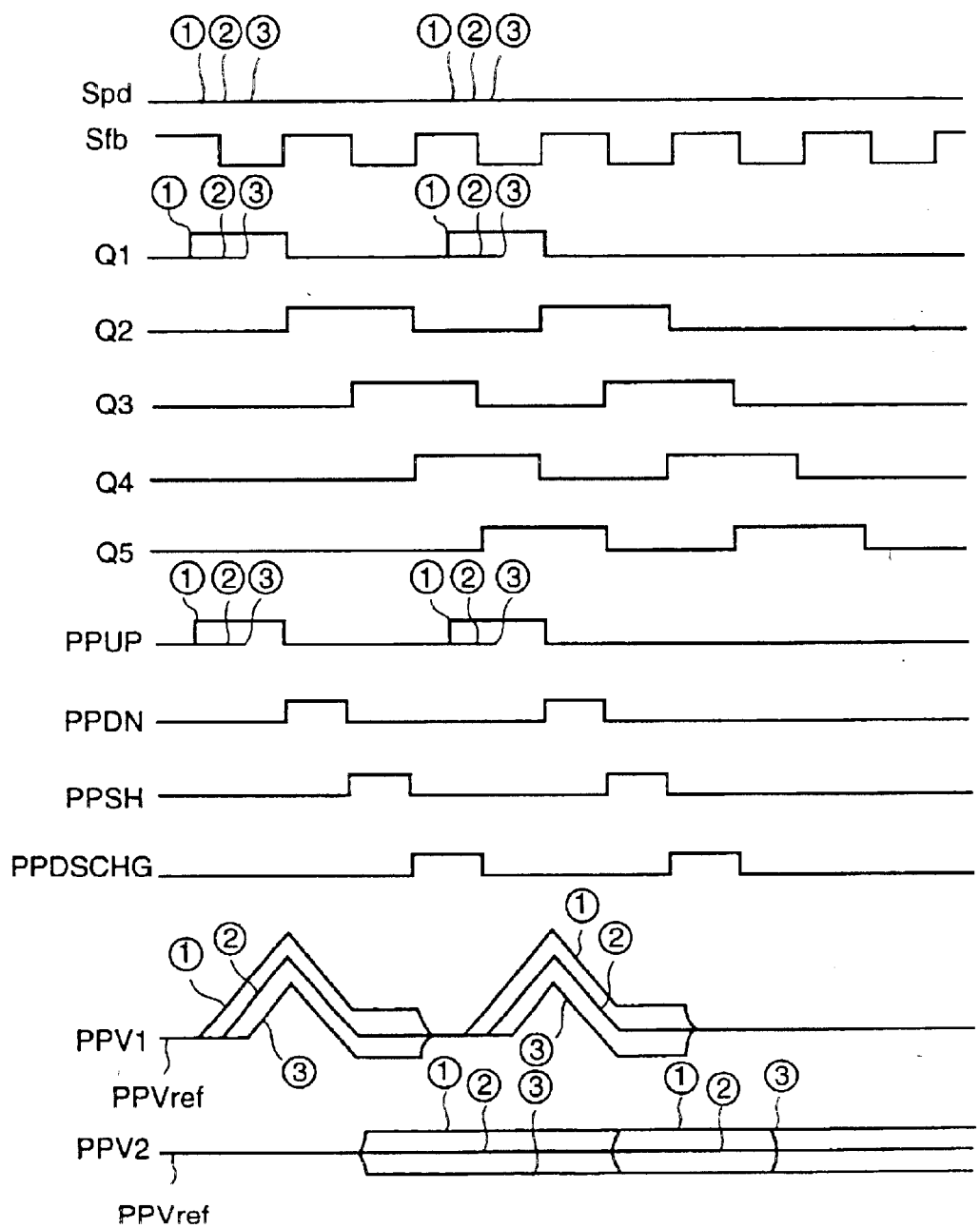
FIG. 6 is a waveform diagram for explaining an operation of the phase comparator of FIG. 5.

FIG. 5 is a circuit diagram of the phase comparator 181 in the recording clock generating apparatus of FIG. 1. FIG. 6 is a waveform diagram for explaining an operation of the phase comparator of FIG. 5.

As shown in FIG. 5, the phase comparator 181 generally comprises a logic circuit 300, an integral circuit 500, and a sample-hold circuit (S/H) 500.

In FIG. 6, ① denotes waveforms of various signals in the phase comparator when the phase of the prepit signal Spd leads the phase of the feedback clock signal Sfb, ② denotes waveforms of various signals in the phase comparator when the phase of the prepit signal Spd accords with the phase of the feedback clock signal Sfb, and ③ denotes waveforms of various signals in the phase comparator when the phase of the prepit signal Spd lags behind the phase of the feedback clock signal Sfb.

Suppose that a time period between a rising edge of the feedback clock signal Sfb and a next rising edge of the same in FIG. 6 is one cycle. Among the signals provided by the logic circuit 300 of FIG. 5, a signal PPUP is set in high level at a varying time in the latter half of one cycle where the feedback clock signal Spd is provided, as shown in the waveform of FIG. 6.

In the case of ②, the signal PPUP has a pulse width that is equal to half cycle of the feedback clock signal Sfb. The pulse width of the signal PPUP is equal to half cycle when the phase of the prepit signal Spd accords with the phase of the feedback clock signal Sfb. As shown in FIG. 6, in the case of ①, the pulse width of the signal PPUP is larger than half cycle of the feedback clock signal Sfb. Further, in the case of ③, the pulse width of the signal PPUP is smaller than half cycle of the feedback clock signal Sfb.

Hence, the pulse width of the signal PPUP varies in proportion to the phase difference between the prepit signal Spd and the feedback clock signal Sfb.

Among the signals provided by the logic circuit 300 of FIG. 5, a signal PPDN is set in high level at a fixed time corresponding to the falling edge of the signal PPUP, as shown in the waveform of FIG. 6. The pulse width of the signal PPDN is always equal to half cycle of the feedback clock signal Sfb.

The signal PPUP and the signal PPDN, output by the logic circuit 300, are delivered to the integral circuit 400 shown in FIG. 5. The integral circuit 400 outputs a voltage PPV1 to the sample-hold circuit 500, in accordance with the signals provided by the logic circuit 300.

When the signal PPUP is in the high level, the output voltage PPV1 of the integral circuit 400 is increased by a predetermined rate as shown in FIG. 6. When the signal PPDN is in the high level, the output voltage PPV1 of the integral circuit 400 is decreased by a predetermined rate as shown in FIG. 6. Immediately before the signal PPUP is set in the high level, an initial level of the output voltage PPV1 of the integral circuit 400 is always set to be equal to a reference voltage PPVref.

As described above, in the case of ①, the pulse width of the signal PPUP is larger than the pulse width of the signal PPDN. In the case of ②, the pulse width of the signal PPUP is equal to the pulse width of the signal PPDN. In the case of ③, the pulse width of the signal PPUP is smaller than the pulse width of the signal PPDN. As shown in FIG. 6, after a pair of the PPUP and PPDN signal pulses are delivered to the integral circuit 400, the output voltage PPV1 of the integral circuit 400 meets the condition PPV1>PPVref for the case of ①, meets the condition PPV1=PPVref for the case of ②, and meets the condition PPV1<PPVref for the case of ③.

Accordingly, after a pair of the PPUP and PPDN signal pulses are provided to the integral circuit 400, the output voltage PPV1 of the integral circuit 400 varies in proportion to the phase difference between the prepit signal Spd and the feedback clock signal Sfb.

In the phase comparator of FIG. 5, a signal PPSH output by the logic circuit 300 is delivered to the sample-hold circuit 500 as a sampling control signal. As shown in FIG. 6, the signal PPSH is set in high level at a fixed time corresponding to the falling edge of the signal PPDN. The pulse width of the signal PPSH is always equal to half cycle of the feedback clock signal Sfb. The sample-hold circuit 500 samples the output voltage PPV1 of the integral circuit 400 at a time corresponding to the rising edge of the sampling control signal PPSH, and outputs the retained voltage PPV2. Accordingly, the output voltage PPV2 of the sample-hold circuit 500 is set at a level proportional to the phase difference between the prepit signal Spd and the feedback clock signal Sfb.

In the phase comparator of FIG. 5, a signal PPDSCHG output by the logic circuit 300 is delivered to the integral circuit 400. The signal PPDSCHG is used to set the initial level of the output voltage PPV1 of the integral circuit 400 to be equal to the reference voltage PPVref immediately before the signal PPUP is set in the high level. As shown in FIG. 6, the signal PPDSCHG is set in high level at a fixed time corresponding to the falling edge of the signal PPSH. The pulse width of the signal PPDSCHG is equal to half cycle of the feedback clock signal Sfb.

When the prepit signal Spd is not provided during one cycle of the feedback clock signal Sfb, the logic circuit 300 of the phase comparator of FIG. 5 does not provide the signals PPUP, PPDN, PPSH and PPDSCHG. In this case, the output voltage PPV2 of the sample-hold circuit 500 is retained at a previous level that corresponds to a previous phase difference between the prepit signal Spd and the feedback clock signal Sfb.

The prepit signal Spd carries the preformat information of the DVD-R 31, but is not influenced by the crosstalk of neighboring grooves because the prepits are provided on the DVD-R 31 such that the prepits on the adjacent lands are not aligned with each other in the radial direction of the disk.

In the present embodiment, the recording clock signal is produced by detecting the phase difference between the prepit signal Spd and the feedback clock signal Sfb at the output of the phase comparator 181. Hence, the recording clock generating apparatus of the present embodiment is effective in producing a recording clock signal precisely synchronized with rotation of the optical disk even when the crosstalk of neighboring grooves is provided by the optical disk.

In the recording clock generating apparatus of FIG. 1, the phase comparator 186 produces the second phase-difference signal based on the difference in phase between the wobble signal Swb and the feedback clock signal Sfb. The second phase-difference signal, output by the phase comparator 186, is delivered through the LPF 187 and the adder 184 to the VCO 185.

The VCO 185 produces the recording clock signal Scr having a phase corrected in response to the phase control signal Scp output by the adder 184. In response to the recording clock signal Scr supplied by the VCO 185, the frequency divider 188 outputs the feedback clock signal Sfb having a lower frequency that is produced by dividing the reference frequency by a given division factor. The feedback clock signal Sfb, output by the divider 188, is sent back to the phase comparator 186.

In the PLL module 18 of FIG. 1, the phase comparator 186, the LPF 187, the adder 184, the VCO 185 and the frequency divider 188 constitute a primary PLL in which the phase of the VCO 185 is locked to the phase of the incoming wobble signal Swb. If the PLL module 18 were constructed with only the primary PLL, it is difficult to produce a recording clock signal precisely synchronized with rotation of the DVD-R 31 because the variance of the wobble signal Swb along the time axis may be caused by the crosstalk of neighboring grooves.

In the PLL module 18 of FIG. 1, the phase comparator 181, the LPF 182, the integrator 183, the adder 184, the VCO 185 and the frequency divider 188 constitute a secondary PLL in which the phase of the VCO 185 is locked to the phase of the incoming prepit signal Spd.

In the PLL module 18 of the present embodiment, the adder 184 produces the phase control signal Scp based on the sum of the first phase-difference signal (which carries the phase difference between the prepit signal Spd and the feedback clock signal Sfb) and the second phase-difference signal (which carries the phase difference between the wobble signal Swb and the feedback clock signal Sfb). The prepit signal Spd is hardly affected by the crosstalk of neighboring grooves. The VCO 185 produces the recording clock signal Scr having the phase corrected in response to the phase control signal Scp. Accordingly, the recording clock generating apparatus of the present embodiment is effective in producing a recording clock signal precisely synchronized with rotation of the optical disk.

Figure 7:
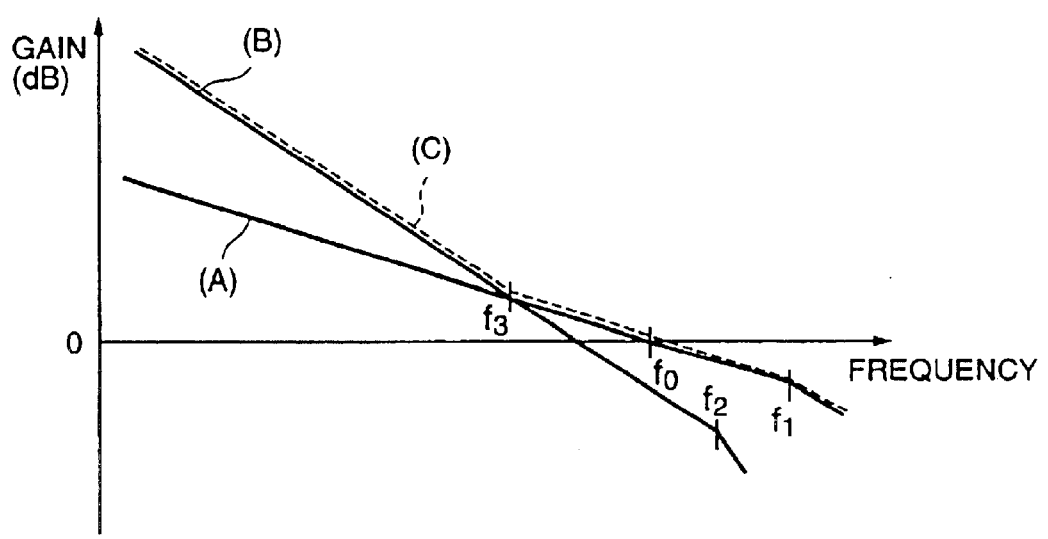
FIG. 7 is a diagram for explaining open-loop frequency characteristics of a PLL module in the recording clock generating apparatus of FIG. 1.

FIG. 7 is a diagram for explaining open-loop frequency characteristics of the PLL module 18 in the recording clock generating apparatus of FIG. 1.

In FIG. 7, (A) indicates an open-loop frequency characteristic curve of the primary PLL (the elements 186, 187, 184, 185 and 188), (B) indicates an open-loop frequency characteristic curve of the secondary PLL (the elements 181, 182, 183, 184, 185 and 188), and (C) indicates an open-loop frequency characteristic curve of the entire PLL module 18.

Suppose that "f1" denotes a cut-off frequency of the LPF 187. The frequency characteristic curve (A) (the solid line), shown in FIG. 7, generally has a gradient of −20 dB/dec for low frequencies that are below the cut-off frequency f1.

Suppose that "f2" denotes a cut-off frequency of the LPF 182. The frequency characteristic curve (B) (the solid line), shown in FIG. 7, generally has a gradient of −40 dB/dec for low frequencies that are below the cut-off frequency f2.

The frequency characteristic curve (C) (the dotted line), shown in FIG. 7, is derived by combining the gains of the frequency characteristic curves (A) and (B). Suppose that "f3" denotes a frequency corresponding to the intersecting point of the frequency characteristic curves (A) and (B). The frequency characteristic curve (C) generally has a gradient of −40 dB/dec for low frequencies that are below the frequency f3, and in this region the gain of the secondary PLL is dominant. The frequency characteristic curve (C) generally has a gradient of −20 dB/dec for high frequencies that are above the frequency f3, and in this region the gain of the primary PLL is dominant.

Suppose that "f0" denotes a zero-cross frequency of the frequency characteristic curve (C). As is readily understood from FIG. 7, in the present embodiment, placing the zero-cross frequency f0 of the frequency characteristic curve (C) at an appropriate location in the region where the lower gradient of −20 dB/dec is provided will make the phase locking operation of the PLL module 18 stable.

Generally, the variance of the wobble signal Swb along the time axis may often take place at relatively low frequencies, which affects the recording clock signal phase.

Suppose that a track "n" of the DVD-R 31 is at a radius "r" from the center of the disk, and an adjacent track "n+1" is located at a one-track advanced position from the radius "r" in the radial direction of the disk. A track length TL(n) from the track "n" to the adjacent track "n+1" is represented by $$TL(n)=2*\pi*r \tag{1}$$

Hereinafter, in the formulas, "*" denotes the multiplication symbol, and "/" denotes the division symbol.

Suppose that "Lw" denotes a tangential wobble length of one cycle of the wobbles along the track of the disk. A phase difference φ(n) between the wobbles on the track "n" and the wobbles on the adjacent track "n+1" is represented by $$\phi(n)=2*\pi*r/Lw \tag{2}$$

Suppose that "Tp" denotes a track pitch of the DVD-R 31. A track length TL (n+1) from the track "n+1" to the adjacent track "n+2" is represented by $$TL(n+1)=2*\pi*(r+1*Tp) \tag{3}$$

A phase difference φ(n+1) between the wobbles on the track "n+1" and the wobbles on the adjacent track "n+2" is represented by $$\phi(n+1)=2*\pi*(r+1*Tp)/Lw \tag{4}$$

Further, a track length TL (n+2) from the track "n+2" to the adjacent track "n+3" is represented by $$TL(n+2)=2*\pi*(r+2*Tp) \tag{5}$$

Further, a phase difference φ(n+2) between the wobbles on the track "n+2" and the wobbles on the adjacent track "n+3" is represented by $$\phi(n+2)=2*\pi*(r+2*Tp)/Lw \tag{6}$$

As is apparent from the foregoing description, the rate of change of the wobble phase difference φ(n) for every track is represented by $$2*\pi*Tp/Lw.$$

If, as practical values, the track pitch Tp is 0.74 μm and the wobble length Lw is 24.8 μm, then the wobble phase difference between adjacent tracks is equal to 0.187 cycles per track. In other words, in this example, the laser beam travels over 5.33 tracks on the disk when the wobble phase difference is varied for one complete period. When the speed of the variance of the wobble signal Swb along the time axis is equivalent to 1/5.33 of the disk rotation speed, the influence on the recording clock signal phase is the maximum. This shows that the variance of the wobble signal Swb takes place at relatively low frequencies.

As shown in FIG. 7, the frequency characteristic curve (C) of the PLL module 18 in the present embodiment generally has a gradient of −40 dB/dec for low frequencies, and in this region the gain of the secondary PLL is dominant. In other words, in the low-frequency region, the loop gain based on the phase difference between the prepit signal Spd and the feedback clock signal Sfb is dominant.

The prepit signal Spd hardly varies along the time axis. The gain of the PLL module 18 at low frequencies is increased by using the phase difference between the prepit signal Spd and the feedback clock signal Sfb. Accordingly, the recording clock generating apparatus of the present embodiment is effective in producing a recording clock signal precisely synchronized with rotation of the DVD-R 31, even when the crosstalk of neighboring grooves is provided by the DVD-R 31.

Figure 8:
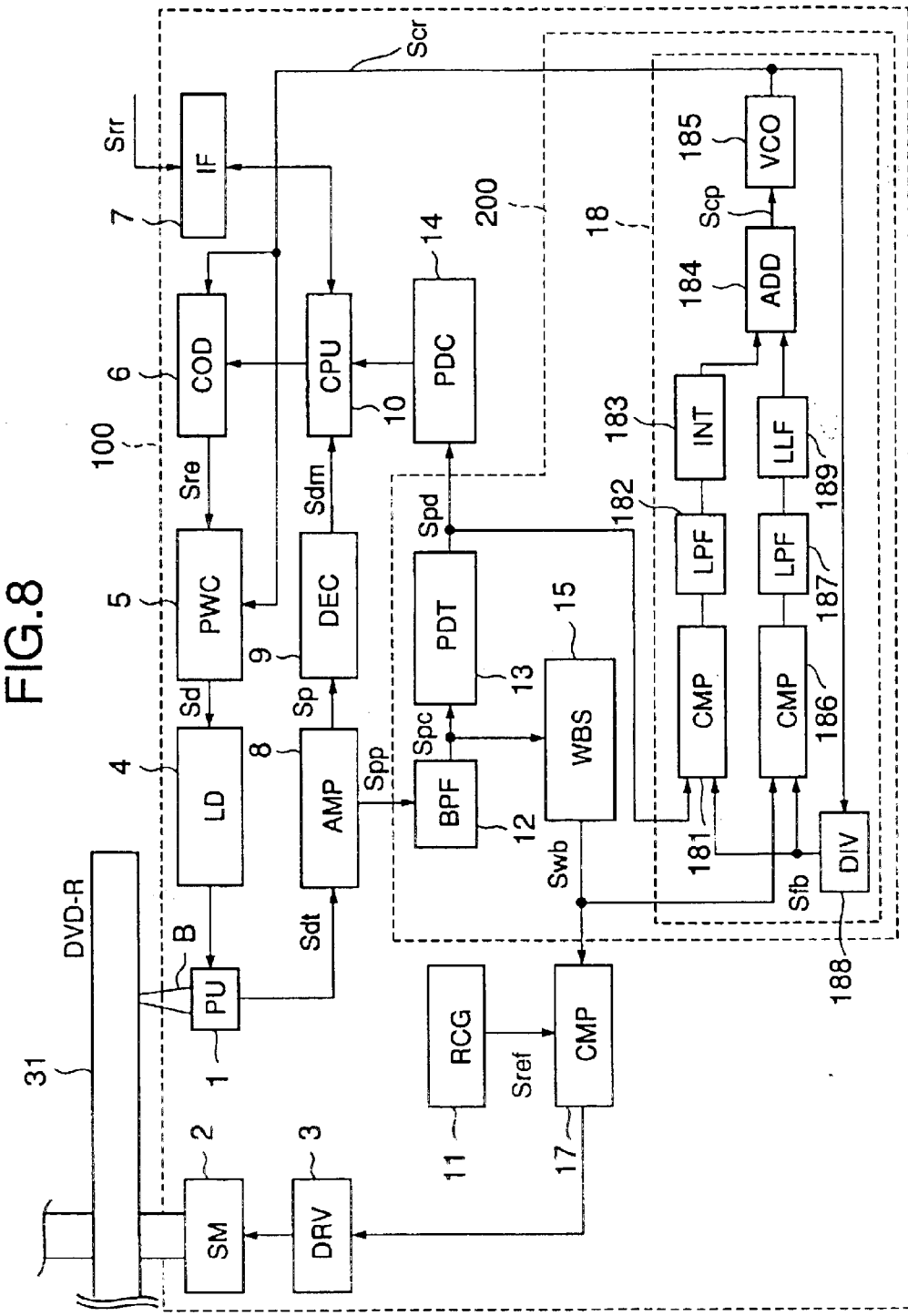
FIG. 8 is a block diagram of another preferred embodiment of the recording clock generating apparatus of the invention.

Next, FIG. 8 is a block diagram of another preferred embodiment of the recording clock generating apparatus of the invention.

The recording clock generating apparatus 200 of FIG. 8 is essentially the same as the previous embodiment of FIG. 1, except the PLL module 18. In FIG. 8, the elements of the recording clock generating apparatus in the present embodiment which are the same as corresponding elements in the previous embodiment of FIG. 1 are designated by the same reference numerals, and a description thereof will be omitted.

As shown in FIG. 8, the PLL module 18 in the present embodiment further includes a lead-lag filter (LLF) 189, which is provided between the LPF 187 and the adder 184. The LLF 189 provides an attenuated signal of low frequency components of the second phase-difference signal output by the LFP 187, and the attenuated signal is delivered to the adder 184. Other elements of the present embodiment are essentially the same as those corresponding elements of the embodiment of FIG. 1.

Figure 9:
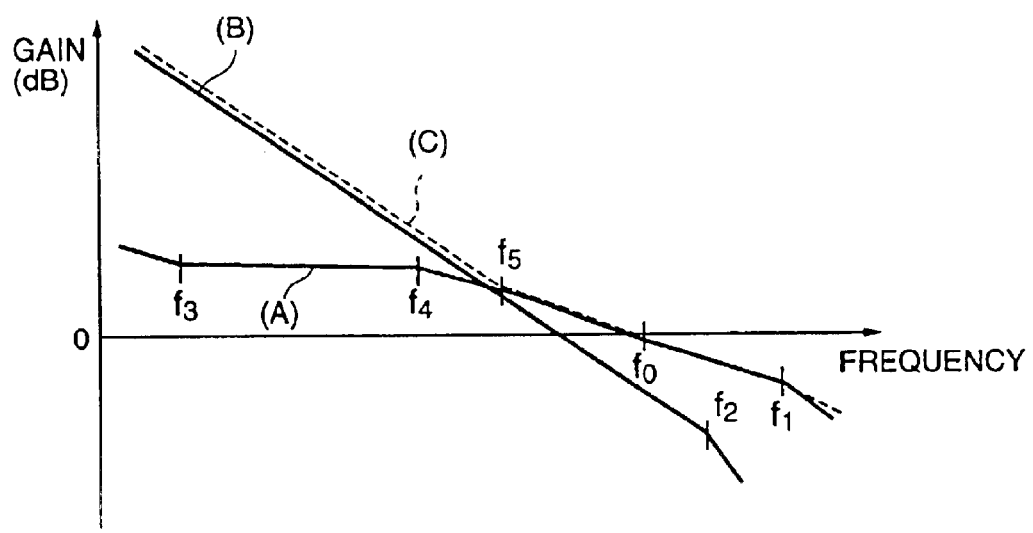
FIG. 9 is a diagram for explaining open-loop frequency characteristics of a PLL module in the recording clock generating apparatus of FIG. 8.

FIG. 9 is a diagram for explaining open-loop frequency characteristics of the PLL module 18 in the recording clock generating apparatus of FIG. 8.

In FIG. 9, (A) indicates an open-loop frequency characteristic curve of the primary PLL (the elements 186, 187, 189, 184, 185 and 188), (B) indicates an open-loop frequency characteristic curve of the secondary PLL (the elements 181, 182, 183, 184, 185 and 188), and (C) indicates an open-loop frequency characteristic curve of the entire PLL module 18.

Suppose that "f1" denotes a cut-off frequency of the LPF 187, "f3" denotes a lead frequency of the LLF 189, and "f4" denotes a lag frequency of the LLF 189, where f3<f4<f1. The frequency characteristic curve (A) (the solid line), shown in FIG. 9, generally has a gradient of −20 dB/dec for frequencies that are below the lead frequency f3, has a gradient of 0 dB/dec for frequencies that range from the lead frequency f3 to the lag frequency f4, and has a gradient of −20 dB/dec for frequencies that range from the lag frequency f4 to the cut-off frequency f1. Apart from the curve (A) of FIG. 7, the loop gain for the low frequencies below the lag frequency f4 in the curve (A) of FIG. 9 is remarkably reduced because of the use of the LLF 189.

Suppose that "f2" denotes a cut-off frequency of the LPF 182. The frequency characteristic curve (B) (the solid line), shown in FIG. 9, generally has a gradient of −40 dB/dec for low frequencies that are below the cut-off frequency f2. This is similar to the curve (B) of FIG. 7.

The frequency characteristic curve (C) (the dotted line), shown in FIG. 9, is derived by combining the gains of the frequency characteristic curves (A) and (B). Suppose that "f5" denotes a frequency corresponding to the intersecting point of the frequency characteristic curves (A) and (B). The frequency characteristic curve (C) generally has a gradient of −40 dB/dec for low frequencies that are below the frequency f5, and in this region the gain of the secondary PLL is dominant. The frequency characteristic curve (C) generally has a gradient of −20 dB/dec for high frequencies that are above the frequency f5, and in this region the gain of the primary PLL is dominant.

Suppose that "f0" denotes a zero-cross frequency of the frequency characteristic curve (C). As is readily understood from FIG. 9, in the present embodiment, placing the zero-cross frequency f0 of the frequency characteristic curve (C) at an appropriate location in the region where the lower gradient of −20 dB/dec is provided will make the phase locking operation of the PLL module 18 stable.

As shown in FIG. 9, the frequency characteristic curve (C) of the PLL module 18 in the present embodiment generally has a gradient of −40 dB/dec for low frequencies, and in this region the gain of the secondary PLL is dominant. In other words, in the low-frequency region, the loop gain based on the phase difference between the prepit signal Spd and the feedback clock signal Sfb is dominant. The gain of the PLL module 18 at low frequencies is increased by using the phase difference between the prepit signal Spd and the feedback clock signal Sfb. Accordingly, the recording clock generating apparatus of the present embodiment is effective in producing a recording clock signal precisely synchronized with rotation of the DVD-R 31, even when the crosstalk of neighboring grooves is provided by the DVD-R 31.

Further, in the present embodiment, the loop gain of the primary PLL for the low frequencies below the lag frequency f4, as in the frequency characteristic curve (A) of FIG. 9, is remarkably reduced by incorporating the LLF 189 into the primary PLL.

Figure 10:
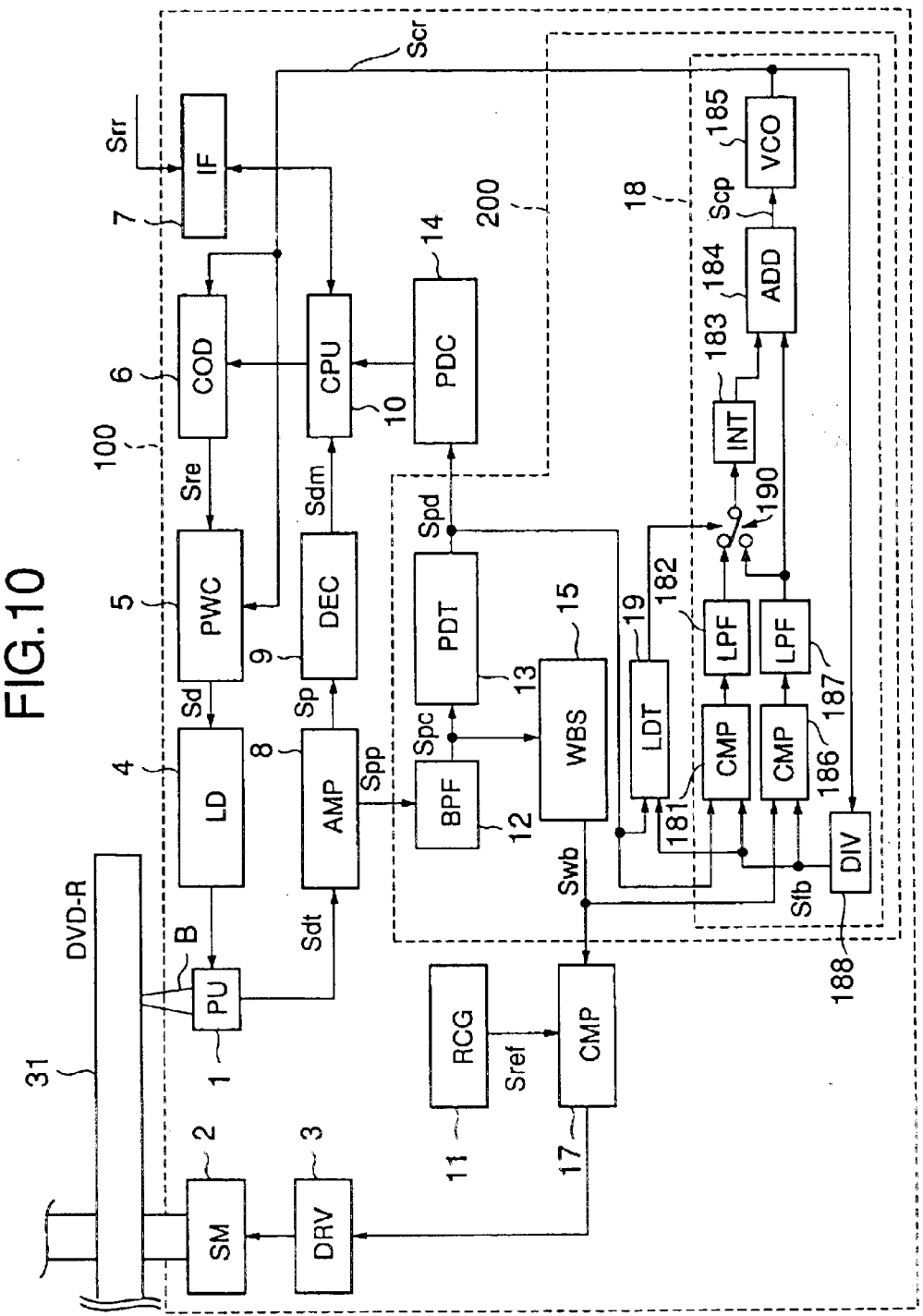
FIG. 10 is a block diagram of another preferred embodiment of the recording clock generating apparatus of the invention.

Next, FIG. 10 is a block diagram of another preferred embodiment of the recording clock generating apparatus of the invention.

The recording clock generating apparatus 200 of FIG. 10 is essentially the same as the previous embodiment of FIG. 1, except the PLL module 18 and a phase determining unit 19. In FIG. 10, the elements of the recording clock generating apparatus in the present embodiment which are the same as corresponding elements in the previous embodiment of FIG. 1 are designated by the same reference numerals, and a description thereof will be omitted.

As shown in FIG. 10, the lock determining unit (LDT) 19 is additionally provided, and the PLL module 18 in the present embodiment further includes a switch 190, which is provided between the LPFs 182 and 187 and the integrator 183.

When the PLL module 18 is running in its initial state, there may be a case in which it is difficult for the PLL module 18 to lock the phase of the recording clock signal.

In the present embodiment, the VCO 185 and the frequency divider 188 serve to produce the feedback clock signal Sfb, and the feedback clock signal Sfb is delivered to each of the lock determining unit 19, the phase comparator 181 and the phase comparator 186. The prepit signal Spd, output by the prepit signal detector 13, is delivered to each of the lock determining unit 19 and the phase comparator 181. The lock determining unit 19 determines whether the PLL is in a locked state or in an unlocked state, based on the feedback clock signal Sfb and the prepit signal Spd.

The determination as to whether the PLL is in the locked state or not is carried out by the lock determining unit 19 by monitoring, for example, the number of pulses included in the prepit signal Spd (corresponding to the prepit B0 at the front end of the sync frame) within a certain time period in relation to the number of pulses included in the feedback clock signal Sfb within the time period.

In the present embodiment, when the PLL is determined as being in the unlocked state, the second phase difference signal, output by the LPF 187, is selected at the switch 190 and delivered to the integrator 183. The PLL module 18 in this case produces the phase control signal Scp based on only the second phase-difference signal supplied by the LPF 187. This operation of the PLL module 18 is different from that in the previous embodiment of FIG. 1.

On the other hand, when the PLL is determined as being in the locked state, the first phase-difference signal, output by the LPF 182, is selected at the switch 190 and delivered to the integrator 183. The PLL module 18 in this case produces the phase control signal Scp based on a sum of an integral signal of the first phase-difference signal and the second phase-difference signal. This operation of the PLL module 18 is essentially the same as that of the embodiment of FIG. 1.

In the present embodiment, the PLL module 18 serves to reduce the variance of the wobble signal Swb along the time axis, affecting the recording clock signal phase. The variance of the wobble signal Swb may often take place at low frequencies. The prepit signal Spd hardly varies along the time axis. The gain of the PLL module 18 at low frequencies is increased by using the phase difference between the prepit signal Spd and the feedback clock signal Sfb. Accordingly, the recording clock generating apparatus of the present embodiment is more effective in producing a recording clock signal precisely synchronized with rotation of the DVD-R 31.

Further, the locking of the phase of the recording clock signal can be quickly carried out by the PLL module 18 in the present embodiment, and the stability of the recording clock signal produced by the PLL module 18 can be increased.

Figure 11:
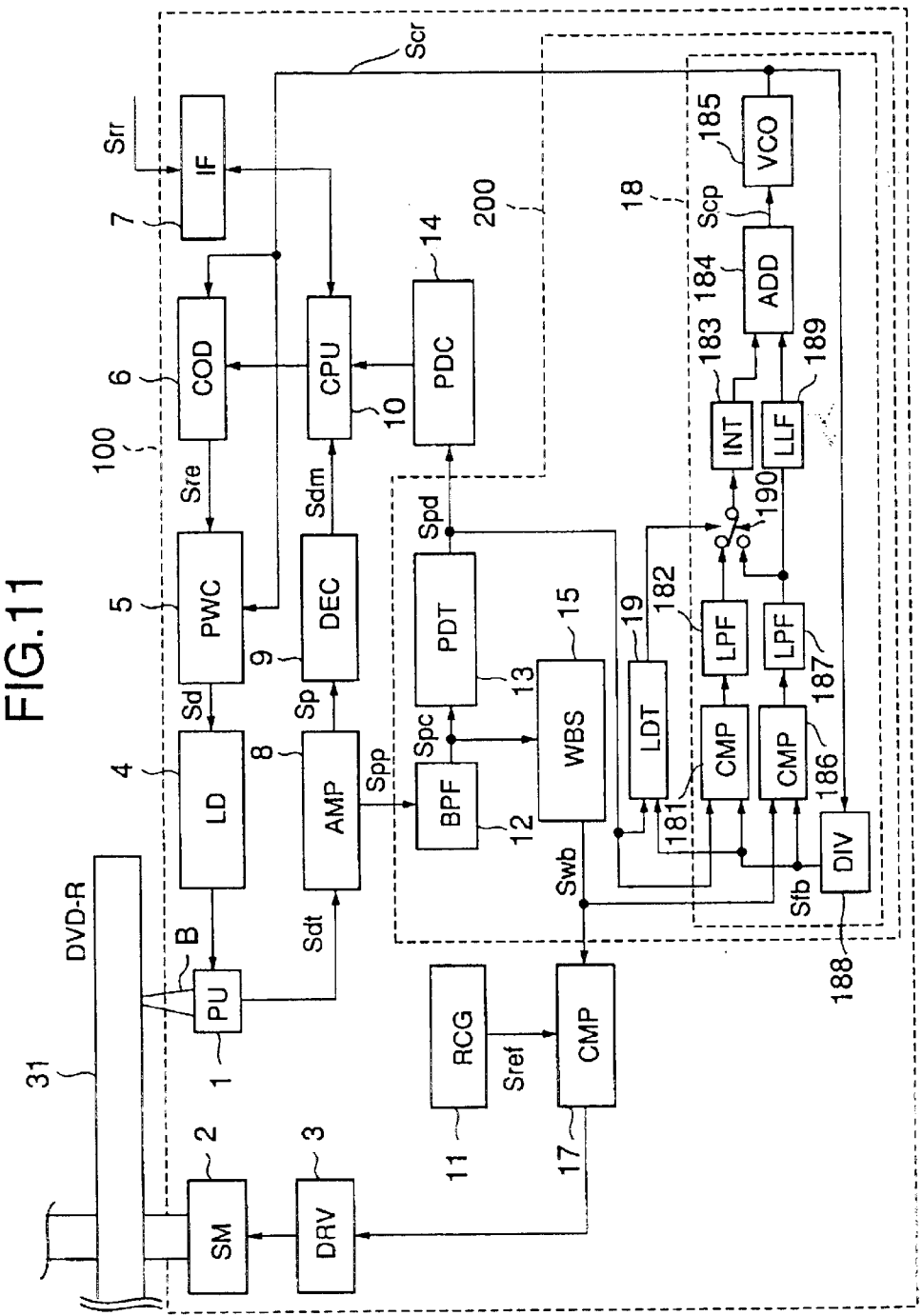
FIG. 11 is a block diagram of another preferred embodiment of the recording clock generating apparatus of the invention.

Next, FIG. 11 is a block diagram of another preferred embodiment of the recording clock generating apparatus of the invention.

The recording clock generating apparatus 200 of FIG. 11 is essentially the same as the previous embodiment of FIG. 10, except the PLL module 18. In FIG. 11, the elements of the recording clock generating apparatus in the present embodiment which are the same as corresponding elements in the previous embodiment of FIG. 10 are designated by the same reference numerals, and a description thereof will be omitted.

As shown in FIG. 11, the PLL module 18 in the present embodiment includes a lead-lag filter (LLF) 189, which is provided between the LPF 187 and the adder 184, in addition to the corresponding elements of the embodiment of FIG. 10. The LLF 189 in the present embodiment is essentially the same as the LLF 189 shown in FIG. 8.

In the PLL module 18 of the present embodiment, the VCO 185 and the frequency divider 188 serve to produce the feedback clock signal Sfb, and the feedback clock signal Sfb is delivered to each of the lock determining unit 19, the phase comparator 181 and the phase comparator 186. The lock determining unit 19 determines whether the PLL is in a locked state or in an unlocked state, based on the feedback clock signal Sfb and the prepit signal Spd.

In the present embodiment, when the PLL is determined as being in the unlocked state, the second phase-difference signal, output by the LPF 187, is selected at the switch 190 and delivered to the integrator 183. The PLL module 18 in this case produces the phase control signal Scp based on only the second phase-difference signal. On the other hand, when the PLL is determined as being in the locked state, the first phase-difference signal, output by the LPF 182, is selected at the switch 190 and delivered to the integrator 183. The PLL module 18 in this case produces the phase control signal Scp based on a sum of an integral signal of the first phase-difference signal and an attenuated signal of low frequency components of the second phase-difference signal.

Similar to the embodiment of FIG. 8, the PLL module 18, which uses the LLF 189, serves to reduce the variance of the wobble signal Swb along the time axis, affecting the recording clock signal phase. The variance of the wobble signal Swb may often take place at low frequencies. The prepit signal Spd hardly varies along the time axis. The gain of the PLL module 18 at low frequencies is increased by using the phase difference between the prepit signal Spd and the feedback clock signal Sfb. Accordingly, the recording clock generating apparatus of the present embodiment is more effective in producing a recording clock signal precisely synchronized with rotation of the DVD-R 31.

Further, the locking of the phase of the recording clock signal can be quickly carried out by the PLL module 18 in the present embodiment, and the stability of the recording clock signal produced by the PLL module 18 can be increased.

The present invention is not limited to the above-described embodiments, and variations and modifications may be made without departing from the scope of the present invention.

Further, the present invention is based on Japanese priority applications No.11-092808, filed on Mar. 31, 1999, and No.11-203173, filed on Jul. 16, 1999, the entire contents of which are hereby incorporated by reference.

What is claimed is:

1. A recording clock generating apparatus which produces a recording clock signal for recording data onto an optical disk, the optical disk having tracks of wobble grooves formed according to a wobble signal indicative of a predetermined frequency, and prepits formed with a given phase relation to the wobble signal, the recording clock generating apparatus comprising:

a wobble signal sampler sampling the wobble signal from a signal obtained from the optical disk;

a prepit signal detector detecting the prepits from the signal obtained from the optical disk, and outputting a prepit signal indicative of preformat information of the disk;

a PLL circuit including an oscillator which outputs the recording clock signal synchronized with the wobble signal, at a frequency according to a voltage of an input signal of the oscillator;

a phase comparator outputting a phase-difference signal based on a phase difference between the prepit signal and a clock signal derived from the recording clock signal; and an integrator outputting a signal indicative of an integration of the phase-difference signal output from the phase comparator.

2. The apparatus according to claim 1 further comprising an adder for receiving the output signal of the integrator and for generating the input signal of the oscillator.

3. A data recording system for recording data onto an optical disk by sending a powered pulse of a laser beam, the optical disk having tracks of wobble grooves formed according to a wobble signal indicative of a predetermined frequency, and prepits formed with a given phase relation to the wobble signal, said data recording system comprising:

a recording clock generating apparatus which produces a recording clock signal;

an encoder providing a modulation signal based on the recording clock signal produced by the recording clock generating apparatus;

a power control unit providing a recording data signal based on the modulation signal provided by the encoder; and a laser driving unit providing a laser drive signal based on the recording data signal provided by the power control unit, wherein the powered pulse of the laser beam is controlled by the laser drive signal; and wherein the recording clock generating apparatus includes: a wobble signal sampler sampling the wobble signal from a signal obtained from the optical disk; a prepit signal detector detecting the prepits from the signal obtained from the optical disk, and outputting a prepit signal indicative of preformat information of the disk; a PLL circuit including an oscillator which outputs the recording clock signal synchronized with the wobble signal, at a frequency according to a voltage of an input signal of the oscillator; a phase comparator outputting a phase-difference signal based on a phase difference between the prepit signal and a clock signal derived from the recording clock signal; and an integrator outputting a signal indicative of an integration of the phase-difference signal output from the phase comparator.

4. The data recording system of claim 3, wherein the recording clock generating apparatus further includes an adder for receiving the output signal of the integrator and for generating the input signal of the oscillator.

5. A PLL module which is provided with an oscillator which outputs a recording clock signal based on a wobble signal indicative of a predetermined frequency, at a frequency according to a voltage of an input signal of the oscillator, when recording data onto an optical disk, the optical disk having tracks of wobble grooves formed according to the wobble signal, and prepits formed with a given phase relation to the wobble signal, the PLL module comprising:

a first phase comparator outputting a phase-difference signal based on a phase difference between the wobble signal and a clock signal derived from the recording clock signal;

a second phase comparator outputting a phase-difference signal based on a phase difference between the prepit signal and the clock signal derived from the recording clock signal;

an integrator outputting a signal indicative of an integration of the phase-difference signal output from the second phase comparator; and an adder outputting a signal indicative of a sum of the output signal of the integrator and the output signal of the first phase comparator, thereby producing the input signal of the oscillator.

6. The PLL module according to claim 5 further comprising a lead-lag filter receiving the output signal of the first phase comparator and outputting an attenuated signal in which low-frequency components of the received output signal of the first phase comparator are attenuated, wherein the adder is provided to output a signal indicative of a sum of the output signal of the integrator and the output signal of the lead-lag filter.

7. The PLL circuit according to claim 5 further comprising a switch adapted to send the output signal of the second phase comparator to an input of the integrator when the clock signal derived from the recording clock signal is locked to the prepit signal, and adapted to send the output signal of the first phase comparator to the input of the integrator when the clock signal derived from the recording clock signal is not locked to the prepit signal.

* * * * *